US009424798B2

(12) United States Patent
Park

(10) Patent No.: US 9,424,798 B2
(45) Date of Patent: Aug. 23, 2016

(54) MOBILE TERMINAL AND CONTROL METHOD THEREOF

(71) Applicant: LG Electronics Inc., Seoul (KR)

(72) Inventor: Jieun Park, Seoul (KR)

(73) Assignee: LG ELECTRONICS, Seoul (KR)

( * ) Notice: Subject to any disclaimer, the term of this patent is extended or adjusted under 35 U.S.C. 154(b) by 125 days.

(21) Appl. No.: 13/726,836

(22) Filed: Dec. 26, 2012

(65) Prior Publication Data
US 2013/0182014 A1 Jul. 18, 2013

(30) Foreign Application Priority Data
Jan. 12, 2012 (KR) .................. 10-2012-0003899

(51) Int. Cl.
*G09G 5/00* (2006.01)
*G06F 1/16* (2006.01)
*G06F 3/01* (2006.01)

(52) U.S. Cl.
CPC ............... *G09G 5/00* (2013.01); *G06F 1/1624* (2013.01); *G06F 1/1643* (2013.01); *G06F 1/1677* (2013.01); *G06F 1/1694* (2013.01); *G06F 3/013* (2013.01); *G06F 3/016* (2013.01); *G06F 2200/1614* (2013.01)

(58) Field of Classification Search
CPC ................ G09G 2340/0492; G06F 2200/164
USPC ........................................ 345/649
See application file for complete search history.

(56) References Cited

U.S. PATENT DOCUMENTS

| 8,358,321 | B1 * | 1/2013 | Weidner ........................ 345/659 |
| 8,830,225 | B1 * | 9/2014 | Karakotsios et al. ......... 345/419 |
| 2006/0248183 | A1 * | 11/2006 | Barton .......................... 709/224 |
| 2006/0265442 | A1 * | 11/2006 | Palayur ........................ 708/200 |
| 2007/0046630 | A1 * | 3/2007 | Hong et al. .................... 345/158 |
| 2008/0152199 | A1 * | 6/2008 | Oijer ............................ 382/118 |
| 2009/0002391 | A1 * | 1/2009 | Williamson et al. .......... 345/619 |
| 2010/0023858 | A1 * | 1/2010 | Ryu et al. ..................... 715/702 |
| 2010/0066688 | A1 | 3/2010 | Jeon ............................. 345/173 |
| 2010/0066763 | A1 | 3/2010 | MacDougall et al. ........ 345/656 |

(Continued)

FOREIGN PATENT DOCUMENTS

| KR | 10-2010-0093507 A | 8/2010 |
| KR | 10-2011-0022840 A | 3/2011 |
| WO | WO2012/030265 | * 3/2012 |

OTHER PUBLICATIONS

S. Yoon, H. G. Jung, J. K. Suhr, and J. Kim, "Non-intrusive iris image capturing system using light stripe projection and pan-tilt-zoom camera," in Proc. of the IEEE International Conference on Computer Vision and Pattern Recognition (CVPR), Jun. 2007.*

Ivana Mikic, Kohsia Huang, Mohan Trivedi, "Activity monitoring and summarization for an intelligent meeting room", Human Motion, 2000. Proceedings. Workshop on, p. 107-112, Dec. 7, 2000.*

(Continued)

*Primary Examiner* — Devona Faulk
*Assistant Examiner* — Jin Ge
(74) *Attorney, Agent, or Firm* — KED & Associates, LLP

(57) ABSTRACT

A mobile terminal for outputting an image and a control method thereof are provided. The mobile terminal includes a terminal main body, a display unit disposed on a front surface of the main body and configured to display an image, a movement sensor mounted in the main body and configured to sense a movement of the main body, a camera sensor activated in response to a movement of the main body, and a controller configured to control a display direction of the image according to a user location sensed by the camera sensor.

15 Claims, 20 Drawing Sheets

(56) References Cited

U.S. PATENT DOCUMENTS

| | | | |
|---|---|---|---|
| 2010/0134425 A1* | 6/2010 | Storrusten | 345/173 |
| 2011/0001762 A1* | 1/2011 | Li et al. | 345/649 |
| 2011/0037866 A1* | 2/2011 | Iwamoto | 348/222.1 |
| 2011/0074822 A1 | 3/2011 | Chang | 345/649 |
| 2011/0185297 A1 | 7/2011 | Reid et al. | |
| 2011/0298829 A1* | 12/2011 | Stafford et al. | 345/659 |
| 2012/0081392 A1* | 4/2012 | Arthur | 345/633 |
| 2012/0188282 A1* | 7/2012 | Li | 345/649 |
| 2013/0120459 A1* | 5/2013 | Dickinson et al. | 345/650 |

OTHER PUBLICATIONS

European Search Report dated Apr. 24, 2013 issued in Application No. 13 00 0020.

Korean Office Action dated Jun. 3, 2013 issued in Application No. 10-2012-0003899.

European Summons to attend oral proceedings pursuant to Rule 115(1) EPC issued in Application No. 13000020.1 dated Mar. 13, 2015.

* cited by examiner

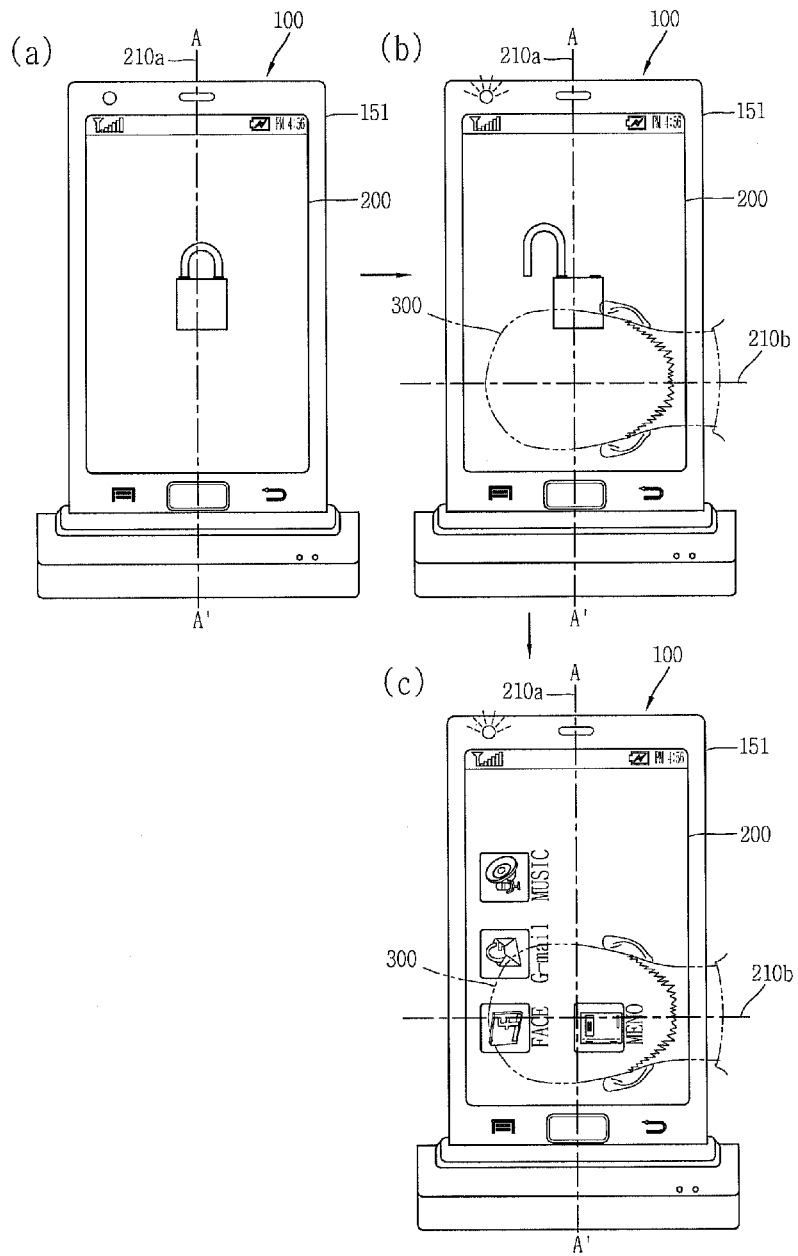

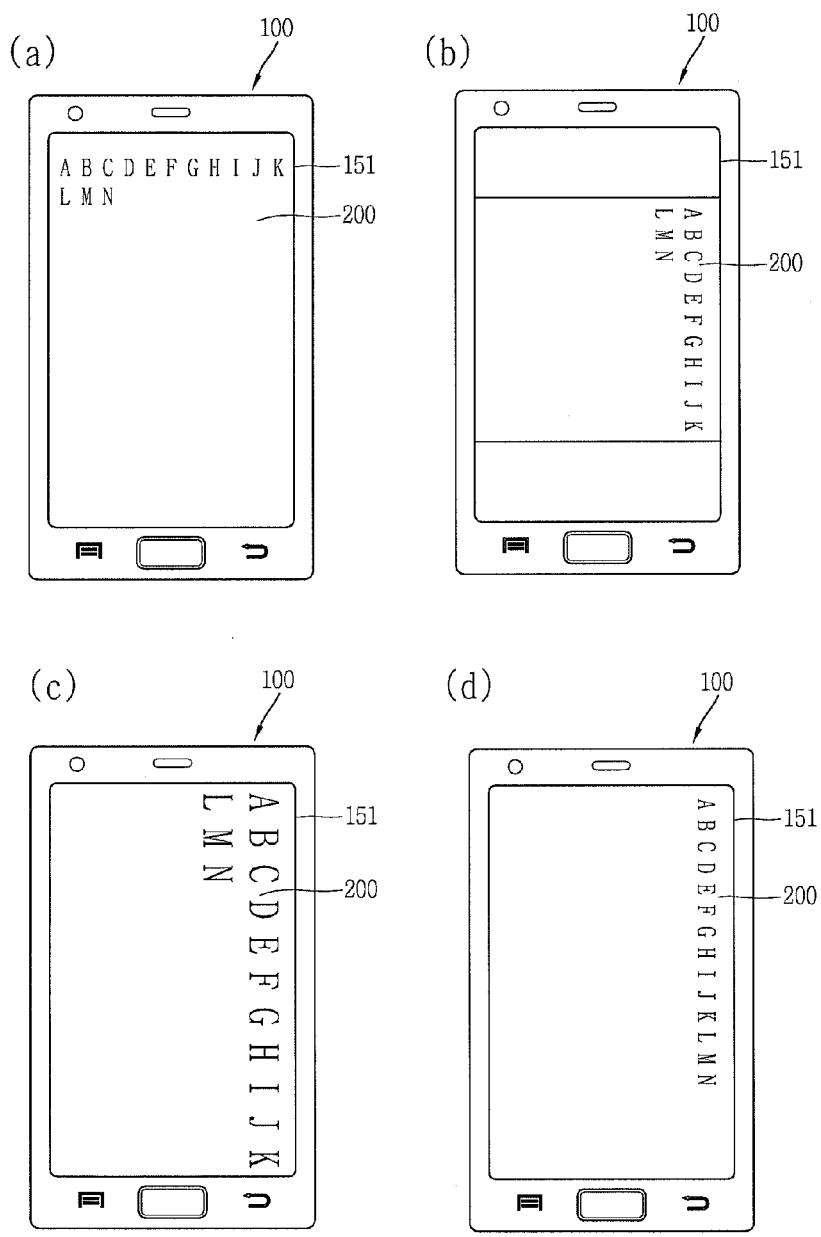

MOBILE TERMINAL AND CONTROL METHOD THEREOF

CROSS REFERENCE TO RELATED APPLICATIONS

The present application claims priority to Korean Application No. 10-2012-0003899 filed in Korea on Jan. 12, 2012, the entire contents of which is hereby incorporated by reference in its entirety.

BACKGROUND OF THE INVENTION

1. Field of the Invention

The present invention relates to a mobile terminal capable of outputting an image and a control method thereof.

2. Description of the Related Art

Mobile terminals may be configured to perform various functions. Various functions may include, for example, a data and voice communication function, a function of capturing an image or video through a camera, a voice storage function, a function of reproducing (or playing) a music file through a speaker system, a function of displaying an image or a video, and the like. Some of mobile terminals include an additional function of executing games, while others may be implemented as multimedia players. In addition, recently, mobile terminals receive broadcast or multicast signals to allow users to view a video or television programs.

Efforts for supporting and increasing the functions of mobile terminals are ongoing. Such efforts may include improvement of software or hardware, as well as alteration and improvement of structural components forming mobile terminals.

Also, when a mobile terminal is moved according to a user movement, an output direction of an image output from the mobile terminal may be changed according to the movement of the mobile terminal.

Thus, once a mobile terminal is moved, an output direction of an image is changed irrespective of a user intention, causing a problem in which a display direction of the output image is not consistent with a direction of the user's eyes. Thus, since the output direction of the image output to the mobile terminal is not consistent with the direction of the user's eyes, the user may feel uncomfortable to view an image output to the mobile terminal.

SUMMARY OF THE INVENTION

Accordingly, an object of the present invention is to provide a mobile terminal capable of outputting an image in a direction consistent with a direction of user's eyes, and a control method thereof.

In order to achieve the above object, there is provided a mobile terminal including: a terminal main body; a display unit disposed on a front surface of the main body and configured to display an image; a movement sensor mounted in the main body and configured to sense a movement of the main body; a camera sensor activated in response to a movement of the main body; and a controller configured to control a display direction of the image according to a user location sensed by the camera sensor.

In an embodiment, the controller may discriminate the user's face from image data applied through the camera sensor, and analyze a relative position between the main body and the user by using the discriminated user's face.

In an embodiment, the controller may calculate an angle between a virtual reference axis set based on a first direction of the main body and the discriminated user's face and control a display direction of the image based on the calculated angle.

In an embodiment, when the calculated angle is outside the reference range, the controller may change the display direction of the image.

In an embodiment, the camera sensor may be activated in response when the main body is tilted at a reference angle or greater in a pre-set direction.

In an embodiment, the controller may adjust a magnifying power of the camera sensor such that data of the user's face is included in image data applied through the camera sensor.

In an embodiment, when the user's face is not discriminated through the image data, the controller may output notification information by using at least one of a voice, a pop-up window, and vibration.

In order to achieve the above object, there is also provided a mobile terminal including: a terminal main body; a display unit disposed on a front surface of the main body and configured to display an image; a sensing unit mounted in the main body and configured to sense a user's location; and a controller configured to control a display direction of an image displayed on the display unit such that the image is maintained in an output direction with respect to the user.

In an embodiment, the sensing unit may sense the user's location based on occurrence of at last one of a movement event with respect to the main body, a power supply event, a touch event, and an application execution event.

In an embodiment, in case in which the power supply event with respect to the main body occurs, when a locked state in which an input of a control command with respect to an application is limited is released, the sensing unit may be activated.

In an embodiment, the sensing unit may include a camera capturing an image, and the controller may convert the captured image into image data, discriminate the user's face by using the image data, and analyze the user's location by using the discriminated face.

In an embodiment, the controller may analyze a direction of the user's eyes with respect to the main body, and rotate an image output to the display unit such that the image corresponds to the direction of the user's eyes.

In an embodiment, an edge region exceeding edges of image may be displayed based on a rotation of the image, and information associated with the output image may be displayed on the edge region.

In an embodiment, at least a portion of a different image arranged in a position corresponding to a direction in which the edge region is positioned based on the image may be displayed on the edge region.

In an embodiment, when an output region of the image is changed according to the rotation of the image, the controller may adjust at least one of a display range of the image and a size of the image such that it corresponds to the changed output region.

In an embodiment, the controller may adjust resolution of the image such that it corresponds to the changed output region.

In an embodiment, the display unit may be configured to be available for a touch input, and a control command generated in response to a touch input for moving an image displayed on the display unit may be generated such that it corresponds to an output direction of the image.

In an embodiment, the display unit may be configured to be available for a touch input, and when a touch input for moving an image displayed on the display unit is applied to the display unit, a control command for moving the image in a direction corresponding to the display direction of the image may be generated.

In an embodiment, while the display direction of the image is being changed in order to maintain an output direction with respect to the user, a previous image displayed before the display direction is changed may overlap.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 8 is a conceptual view for describing the control method of FIG. 7.

FIGS. 10A, 10B, and 11 are conceptual views for describing methods for outputting an image from a mobile terminal according to an embodiment disclosed in the present disclosure.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself. Accordingly, the 'module' and 'part' may be mixedly used. In describing the present invention, if a detailed explanation for a related known function or construction is considered to unnecessarily divert the gist of the present invention, such explanation has been omitted but would be understood by those skilled in the art. It will be appreciated that the accompanying drawings are presented to help understand the present invention more clearly and the technical concept of the present invention is not limited by the accompanying drawings.

Mobile terminals described in the present disclosure may include mobile phones, smart phones, notebook computers, tablet computers, digital broadcast receivers, PDAs (Personal Digital Assistants), PMPs (Portable Multimedia Player), navigation devices, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

Figure 1:
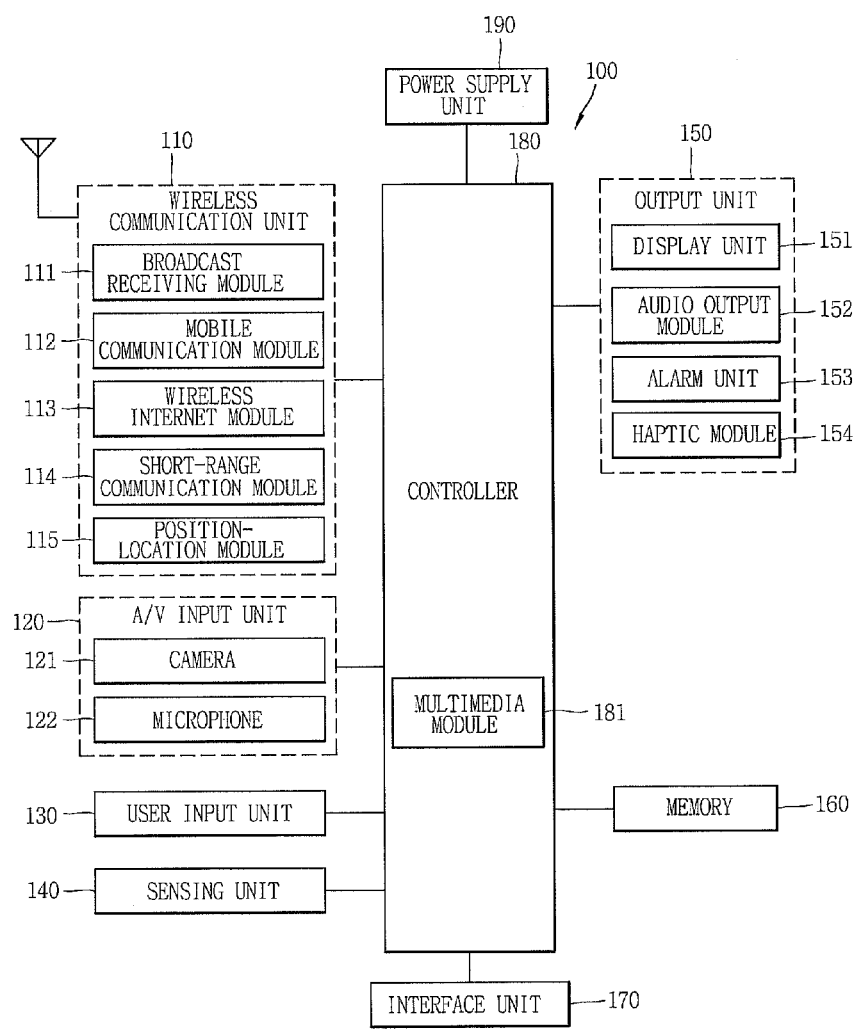
FIG. 1 is a block diagram of a mobile terminal according to an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only)(MediaFLO®, integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit (or a detection unit) 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of the displays may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Also, the mobile terminal that may include at least one or more of the components as described above is able to change a display direction of an image output to the display unit 151 such that the image is maintained in a direction of the user's eyes.

Hereinafter, a method of changing an output direction of an image (or a direction in which an image is output) by using the mobile terminal according an embodiment of the present invention will be described.

Figure 3:
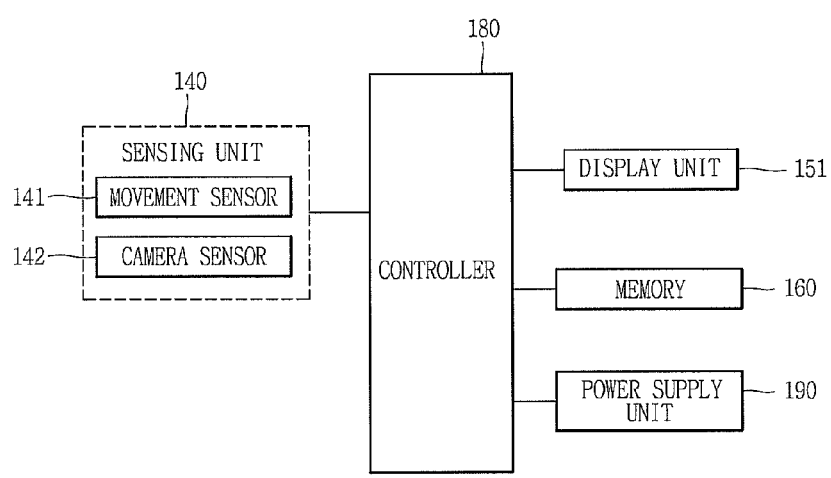
FIG. 3 is a block diagram schematically showing the mobile terminal according to an embodiment disclosed in the present disclosure.
Figure 4:
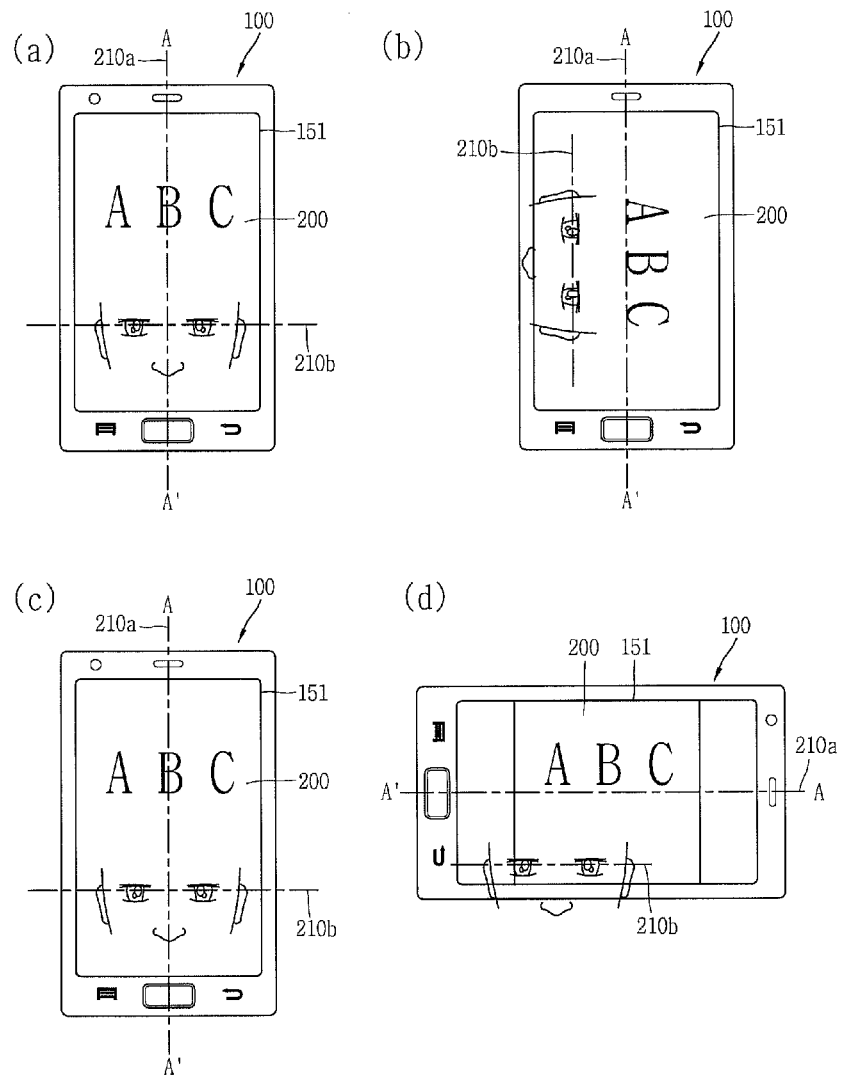
FIG. 4 is a conceptual view of the mobile terminal according to an embodiment disclosed in the present disclosure.

FIG. 3 is a block diagram schematically showing the mobile terminal according to an embodiment disclosed in the present disclosure, and FIG. 4 is a conceptual view of the mobile terminal according to an embodiment disclosed in the present disclosure. Here, content which has been already described with reference to FIG. 1 will be omitted.

With reference to FIG. 3, the mobile terminal may include the controller 180, the sensing unit 140, the display unit 151, the memory 160, and the power supply unit 170.

The controller 180 may control a display direction of an image output to the display unit 51 by using a user's location sensed by the sensing unit 140.

Here, an 'image' displayed on the display unit 151 may refer to every image displayed on the display unit 151 of the mobile terminal 100 according to an embodiment of the present invention.

For example, an 'image' may refer to any image, such as a home screen, an executed screen of an application, a Web page, a screen related to a voice call and a video call, and the like, that can be displayed through the display unit 151.

Figure 2A:
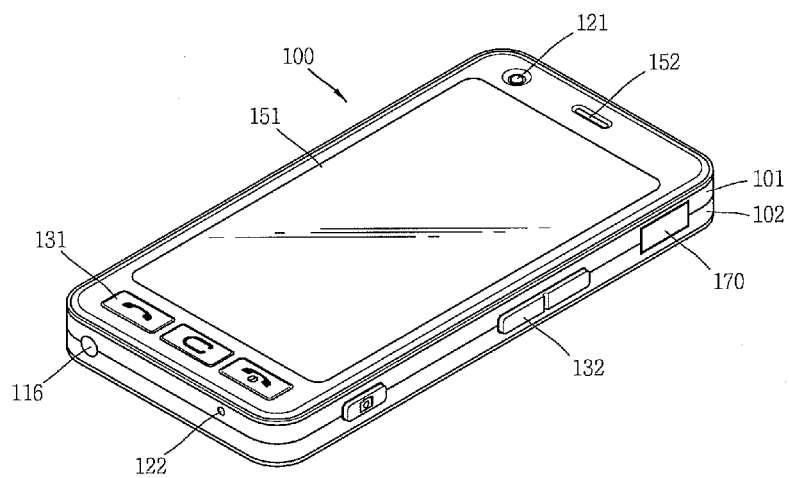
FIGS. 2A and 2B are front perspective views of the mobile terminal according to an embodiment of the present invention.
Figure 2B:
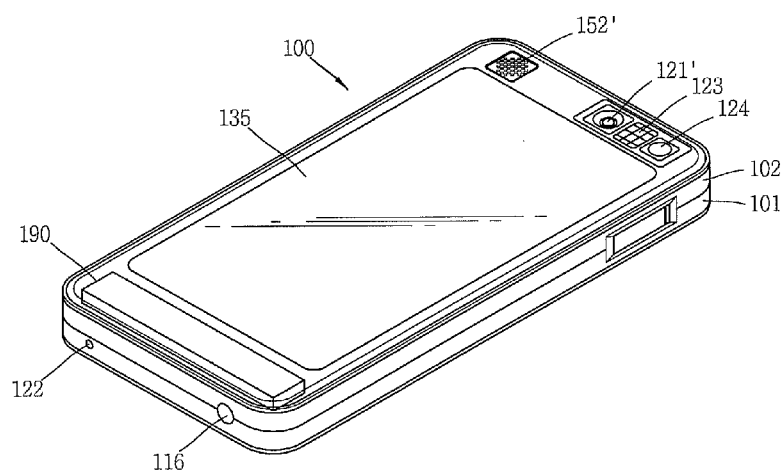

The sensing unit 140 may be formed to sense a user's location. The sensing unit 140 may include at least any one of a camera (or a camera sensor 142) and a laser sensor (not shown). The laser sensor may be mounted in a terminal body, scans laser and detects a reflected laser to thus sense a distance between the terminal body and a sensing target. The camera 142 may be configured to capture a two-dimensional (2D) location of the user (or the sensing target) (See 121 in FIG. 2A).

For example, the terminal may discriminate a 2D location of the user by using an image captured through the camera 142 to recognize a direction of the user's eyes (or a direction in which the user views).

Namely, the terminal may discriminate the user's fact direction from image data applied through the camera 142 and analyze a relative location between the terminal and the user.

In addition, the terminal may combine the 2D location of the sensing target in the image captured by the camera 142 and the distance obtained through the laser sensor to sense a three-dimensional (3D) location of the sensing target. When a 2D image of the user is required, the sensing unit 140 may include only the camera 142. However, the present invention is not limited thereto, and may include at least any one of a proximity sensor, a stereoscopic touch sensing unit, an ultrasonic wave sensing unit, or the like.

As described above, the sensing unit 140 for sensing a user's location may be activated based on an 'activation event' to sense a user's location.

The 'activation event' is an event generating a control command for sensing a user's location through the sensing unit 140. The activation event may occur by various causes such as a rotation of the terminal, whether or not power is supplied, releasing of a locked state, execution of a pre-set application by the user or the controller 180, a touch input with respect to the terminal, and the like.

For example, the activation event may occur when the terminal main body 100 (See FIG. 2A) is rotated by a pre-set range in a reference direction.

Namely, a rotation of the terminal main body 100 (See FIG. 2A) may be sensed by a motion sensor 141. The motion sensor 141 may be mounted within the mobile terminal 100 and recognize a movement or a location of the mobile terminal 100. The motion sensor 141 may include a terrestrial magnetism sensor, an acceleration sensor, a gyro sensor, and the like.

When a movement of the terminal is sensed by the motion sensor 141, the controller 180 may analyze a user's location (or direction of his/her eyes) through the camera sensor 142 and control a display direction of an image.

Namely, the controller 180 may analyze the direction of the user's eyes by using the user's location (or a direction of the user's face) sensed by the sensing unit 140, and control a display direction of the image output to the display unit 151 such that the display direction of the image output to the display unit 151 is consistent with the direction of the user's eyes.

For example, the method of outputting an image such that it corresponds to the direction of the user's eyes will be described with reference to FIG. 4. As shown in FIG. 4(*a*), when the user's face is positioned to correspond to a length direction (i.e., a direction starting from the audio output unit 152 toward the first manipulation unit 131, i.e., an A-A' direction) of the mobile terminal 100 (See FIG. 2A), an image output to the display unit 151 is output to correspond to the length direction.

As shown in FIG. 4(*b*), when the user's face is bent to the right by 90 degrees based on a gravity (G) direction in the length direction, the controller 180 may rotate the image output to the display unit 151 to the right by 90 degrees based on the gravity (G) direction from a previous output direction, and output the image.

Namely, in this case, since the direction 210b of the user's eyes has been rotated by 90 degrees to the right from the previous direction 210b of the user's eyes 210b (See FIG. 4(a), the controller 180 may rotate the image by 90 degrees to the right in order to make the display direction of the image output to the display unit 151 consistent with the direction 210b of the user's eyes, and display the image.

Also, in another example, as shown in FIGS. 4(c) and 4(d), when the mobile terminal 100 has been rotated by 90 degrees to the right based on the previous length direction (A-A' direction) and the gravity direction but the direction 210b of the user's face (or the direction of the user's eyes) is maintained as is without being rotated, the image output to the display unit 151 may be rotated by 90 degrees to the left from the previous output direction so as to be output. Namely, in this case, since the output direction of the image is not consistent with the direction 210b of the user's eyes, the controller 180 may rotate the display direction of the image output to the display unit 151 by 90 degrees to the left in order to make the display direction of the image consistent with the direction of the user's eyes, and display the image.

As described above, in the mobile terminal according to an embodiment of the present invention, the image output to the display unit is maintained in the output direction with respect to the user, whereby when the mobile terminal is slightly moved, the display direction of the image is changed according to the sensing by the motion sensor. Thus, an image having a form different from the user intention is prevented from being output.

An embodiment of controlling a display direction of an image output to the display unit will be described in detail.

Figure 5:
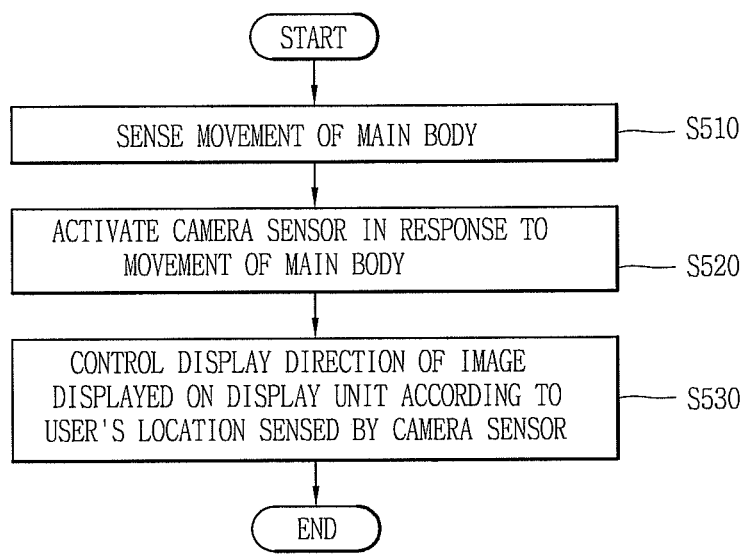
FIG. 5 is a flow chart illustrating a control method of the mobile terminal according to another embodiment disclosed in the present disclosure.
Figure 6:
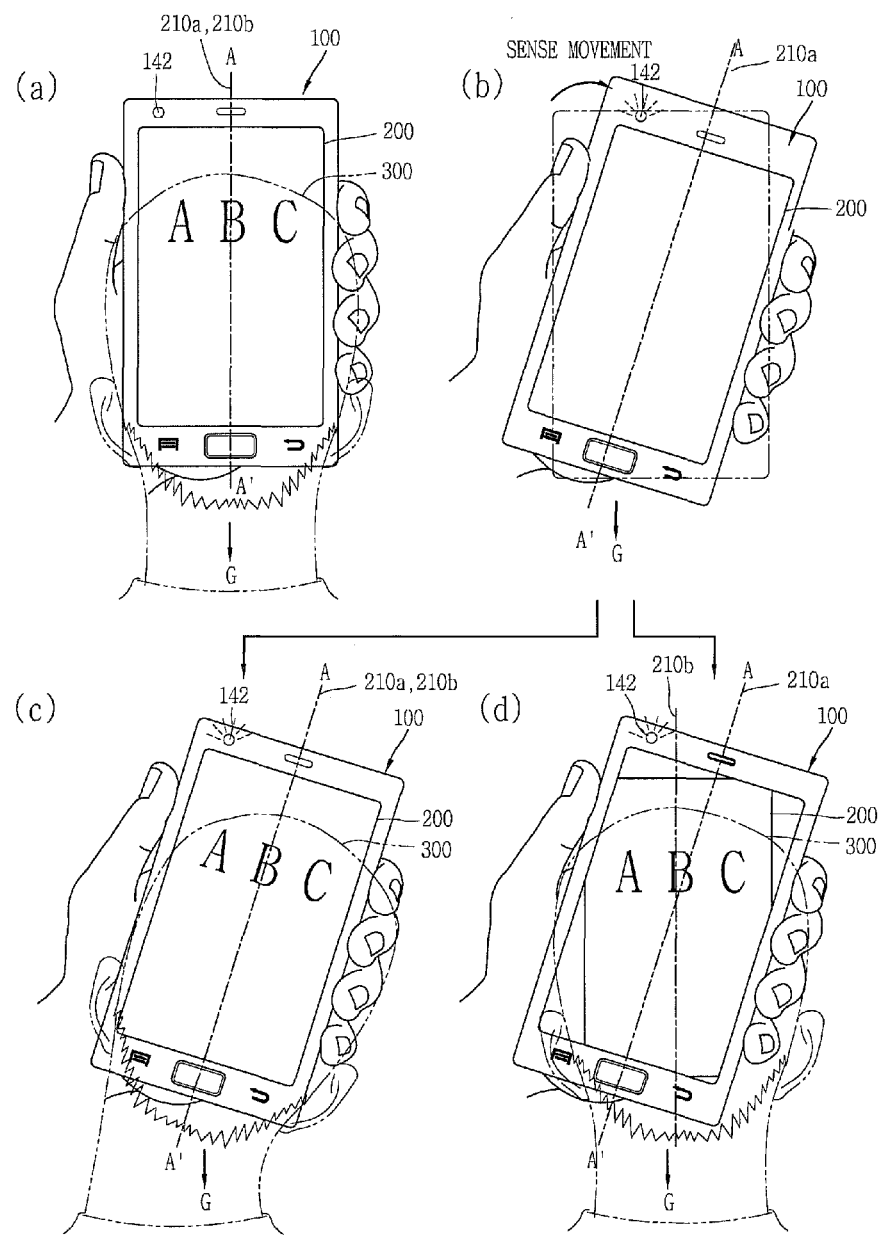
FIG. 6 is a conceptual view for describing the control method of FIG. 5.

FIG. 5 is a flow chart illustrating a control method of the mobile terminal according to another embodiment disclosed in the present disclosure, and FIG. 6 is a conceptual view for describing the control method of FIG. 5.

First, the sensing unit 140 (See FIG. 3) senses a movement of the terminal main body 100 (S510).

The motion sensor 141 may be mounted within the mobile terminal 100 and recognize a movement or location of the mobile terminal 100. The motion sensor 141 may include at least one of a terrestrial magnetism sensor, a gyro sensor, and an acceleration sensor.

The terrestrial magnetism sensor is a sensor for detecting a direction and a size of a terrestrial magnetism, and generating an electrical signal by using the detected direction and size of the terrestrial magnetism. The gyro sensor is a sensor for detecting a rotation speed of the terminal main body 100 and generating an electrical signal by using the detected rotational speed of the terminal main body 100. The acceleration sensor is a sensor for measuring a direction of gravity acceleration, detecting a change in acceleration in one direction, and generating an electrical signal by using the detected change in the acceleration.

Accordingly, the movement sensor 141 may sense whether or not the terminal main body 100 is rotated. Namely, the movement sensor 141 may detect displacement according to a rotation of the terminal main body 100, namely, a rotation direction and a rotation angle of the terminal main body 100, and generate an electrical signal by using the detected rotational direction and rotational angle.

Here, whether or not the terminal main body 100 is rotated as sensed by the movement sensor 141 may refer to in what angle the terminal main body 100 is tilted in the gravity direction (G) based on the length direction A-A' as shown in FIG. 6(a).

Namely, when the main body 100 is positioned in the length direction (A-A')', an angle between the length direction A-A' and the gravity direction G may be 0 or 180.

Meanwhile, when a movement of the terminal main body 100 is sensed by the motion sensor 141, the controller 180 activates the camera sensor 142 in response to the movement of the terminal main body 100 (S520).

The controller 180 may control whether to activate the camera sensor 142 according to a degree of the movement of the terminal main body 100.

For example, when the terminal main body 100 is tilted at a reference angle or more in a pre-set direction, the camera sensor 142 may be activated in response.

Namely, the camera sensor 142 may be activated only when the terminal main body 100 is tilted in a range equal to or greater than a pre-set reference angle range with respect to the gravity direction G (See FIG. 6(b)).

Also, the camera sensor 142 may be activated once a movement of the terminal main body 100 is sensed by the movement sensor 141. Namely, a degree of movement of the terminal main body 100 for determining whether to activate the camera sensor 142 may be variably changed through setting of the controller 180 or according to a user selection.

As discussed above, when the camera sensor 142 is activated in response to a movement of the terminal main body 100 (S520), the controller 180 controls a display direction of an image displayed on the display unit 151 according to a user's location sensed by the camera sensor 142 (S530).

Namely, the controller 180 may discriminate the user's face from image data applied through the camera sensor 142, and analyze a relative location between the terminal main body 100 and the user by using a tilt degree of the discriminated face.

The controller 180 analyzes a tilt degree of length direction A-A' (See FIG. 6(b)) of the terminal main body 100 and a deviation degree of the direction of the user's face. Here, the length direction A-A' of the terminal main body 100 may be expressed as a 'virtual reference axis', and the controller 180 may calculate an angle between the virtual reference axis and the discriminated face, and control a display direction of the image based on the calculated angle.

Also, although the main body 100 is moved, only when the angle between the direction of the user's face and the virtual reference axis of the terminal main body 100 exceeds a reference range, the controller 180 may change the display direction of the image. Namely, in this case, when the direction of the user's face and the reference direction (i.e., the length direction or the direction of the virtual reference axis) of the terminal main body 100 are not consistent within a pre-set margin of error, the display direction of the image may not be changed.

Also, conversely, when the reference direction (i.e., the length direction or the direction of the virtual reference axis) of the terminal main body 100 and the direction of the user's face are not consistent, the controller 180 may change the display direction of the image.

Hereinafter, a method of changing a display direction of an image will be described with reference to FIG. 6. When the terminal main body 100 is moved from the position illustrated in FIG. 6(a) to the position illustrated in FIG. 6(b), namely, when the angle between the length direction A-A' (or the reference axis 210a) and the gravity direction G is changed, the camera sensor 142 may be activated.

And, as shown in FIGS. 6(c) and 6(d), the controller 180 determines whether to change an output direction of an image 200 according to the deviation degree of the direction of the user's face and the tilt degree of the length direction A-A' 210a of the terminal main body 100.

For example, as shown in FIG. 6(c), when the direction of the user's face sensed by the camera sensor 142 corresponds to the tilt direction and tilt degree of the terminal main body 100, the controller 180 does not change the output direction of the image 200.

Namely, although the main body 100 is tilted, if the direction of the user's eyes and the output direction of the terminal main body 100 are consistent, the image 200 may be maintained in the existing output direction.

Thus, as shown in FIG. 6(c), when the reference axis 210a of the terminal main body 100 and the reference axis 210b corresponding to the user's face correspond to each other, the output direction of the image 200 is not changed.

However, as shown in FIG. 6(d), when the direction of the user's face sensed by the camera sensor 142 does not correspond to the tilt direction of the terminal main body 100 and the tilt degree of the terminal main body 100, the controller 180 changes the output direction of the image 200 such that it corresponds to the direction of the user's face.

Namely, when the direction of the user's eyes and the output direction of the terminal main body 100 are not consistent due to the tilt of the terminal main body 100, the image 200 is changed to correspond to the direction of the user's eyes from the existing output direction.

Thus, as shown in FIG. 6(d), when the reference axis 210a of the terminal main body 100 and the reference axis 210b corresponding to the user's face is not consistent with each other or exceed the reference range, the output direction of the image 200 is changed. Thus, the image output to the display unit 151 may be output in the direction deviated by the range corresponding to the direction of the user's face based on the virtual reference axis 210a with respect to the terminal main body 100.

As discussed above, in the mobile terminal according to an embodiment of the present invention, the user's location is sensed according to a movement of the terminal main body 100, and a display direction of an image output to the display unit is controlled by using the sensed location of the user, whereby the user may be provided with an image corresponding to the direction of the user's eyes although the terminal main body 100 is moved.

Meanwhile, in FIGS. 5 and 6, the example in which the display direction of an image is changed according to a movement of the terminal main body 100 has been described. Here, a cause triggering an activation event for activating the camera sensor may be a 'movement of the terminal main body'.

Meanwhile, besides, the causes triggering the activation event for controlling the output direction of an image based on the terminal main body 100 and the user's location may be variably set. For example, when the terminal main body 100 is connected to an electric charge hanger and is currently receiving power therefrom, in general, the terminal main body 100 is not moved. Thus, in this case, the camera sensor may be activated according to whether or not the terminal is used (releasing a locked state, execution of an application, whether or not a control command is applied from the user to the terminal, or the like).

Also, when the main body is not connected to the electric charge hanger to receive power, a cause triggering the activation event for activating the camera sensor may be variably set according to circumstances or by the user or the controller 180.

A method of changing a display direction of an image based on an activation event as mentioned above will be described in detail.

Figure 7:
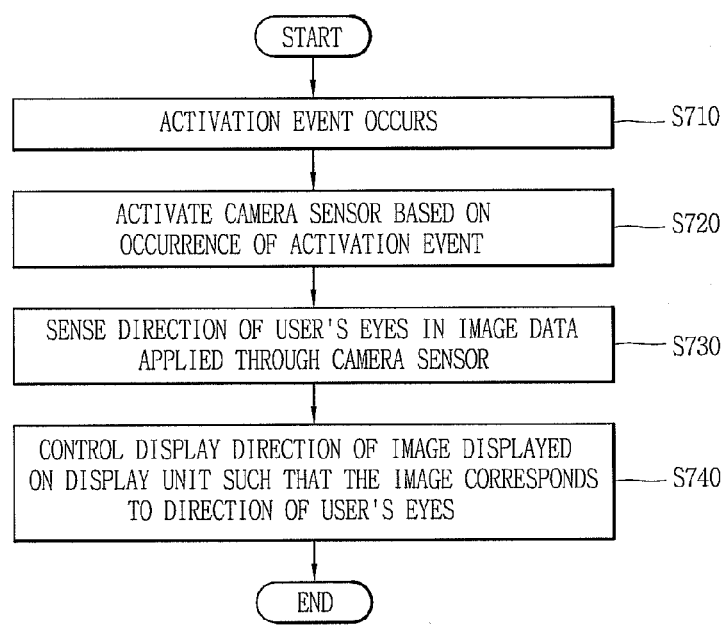
FIG. 7 a flow chart illustrating a control method of the mobile terminal according to another embodiment disclosed in the present disclosure.

FIG. 7 a flow chart illustrating a control method of the mobile terminal according to another embodiment disclosed in the present disclosure, and FIG. 8 is a conceptual view for describing the control method of FIG. 7.

First, the controller 180 determines whether or not an activation event for activating the camera sensor has occurred (S710).

Here, as described above, the activation event may be triggered by various causes, and the controller 180 or the user may set one or a plurality of causes triggering the activation event.

For example, a case in which a cause triggering an activation event for activating the camera sensor is changing a state of the terminal from a locked state to an unlocked state in a state in which the terminal main body 100 is connected to the electric charge hanger 250 will be described.

Here, the 'locked state' is a state in which the user's control command with respect to an application installed in the mobile terminal is limited. Namely, the mobile terminal is classified into the 'locked state' and the 'unlocked state' according to whether or not a user's control command with respect to the mobile terminal is permitted.

This is to mainly prevent functions and applications of the mobile terminal from being activated or deactivated as a control command not intended by the user is input to the mobile terminal having the touch screen 151. Thus, in the locked state, an input of a control command by the user through the touch screen 151 and other user input unit 130 (See FIG. 2A) is limited within a pre-set range.

Also, the unlocked state refers to a state in which an input of a control command by the user with respect to the mobile terminal is not limited. Thus, in the unlocked state, functions and applications of the mobile terminal may be activated or deactivated according to a control command input by the user.

As shown in FIG. 8(a), in the locked state in which the terminal is locked, when the terminal state is changed to the unlocked state according to a control command from the user (e.g., a touch input for changing the locked state to the unlocked state), the controller 180 may sense an occurrence of an activation event.

Then, the controller 180 activates the camera sensor 142 (See FIG. 3) based on the occurrence of the activation event (S720) (See FIG. 7).

And, the controller 180 senses the direction of the user's eyes by using image data obtained through the activate camera sensor 142 (S730).

Namely, the controller 180 changes an image captured by the camera sensor 142 into image data, discriminates the user's face (or a face direction) by using the image data, and analyzes the user's location by using the discriminated face (or the face direction).

The controller 180 discriminates a relative relationship between the terminal main body 100 and the user's location and controls a display direction of the image such that the output direction of the image displayed on the display unit corresponds to the direction of the user's eyes (S740).

For example, as shown in FIG. 8(b), the controller may discriminate the user's face from the image data applied through the camera sensor 142 and analyze a relative location between the terminal main body 100 and the user by using a tilt degree of the discriminated face.

The controller 180 analyzes the length direction A-A' (See FIG. 8(b)) of the terminal main body 100 and a deviation degree of the direction of the user's face. Here, the length direction A-A' of the terminal main body 100 may be expressed as a 'virtual reference axis', and the controller 180 may calculate an angle between the virtual reference axis and the discriminated face and control the display direction of the image based on the calculated angle.

Thus, as illustrated, when the direction 210b of the user's face sensed through the camera sensor 142 does not correspond to the direction of the virtual reference axis 210a based on the terminal main body 100, the controller 180 changes the output direction of the image 200 such that it corresponds to the direction 210b of the user's face.

Namely, when the direction of the user's eyes is not consistent with the output direction of the terminal main body 100, the image is changed to correspond to the direction of the user's eyes from the existing output direction.

Thus, as shown in FIG. 8(c), the image output to the display unit 151 is not output in the direction of the virtual reference axis 210a but output to correspond to the direction 210b of the user's face (or the direction of the user's eyes).

As discussed above, in the mobile terminal according to an embodiment of the present invention, based on an activation event that may be triggered by various causes, the user's location is sensed and a display direction of an image output to the display unit is controlled such that it corresponds to the sensed user's location, whereby the user can be provided with an image consistent with the direction of the user's eyes.

In the above, the method for sensing the direction of the user's face based on a movement of the terminal main body and various other activation events and controlling the display direction of an image accordingly has been described.

Meanwhile, the direction of the user's face or the user's location may be sensed by the camera sensor mounted in the terminal main body of the mobile terminal. Here, when the camera sensor is not in a state in which it cannot recognize a user's location, the controller may control the camera sensor or guide to output notification information such that effective image data can be obtained. Hereinafter, a method for controlling the camera sensor or outputting notification information will be described in detail with reference to FIGS. 9A, 9B, 9C, and 9D.

FIGS. 9A, 9B, 9C, and 9D are conceptual views for describing methods for controlling the camera sensor of the mobile terminal and images input through the camera sensor according to an embodiment disclosed in the present disclosure.

When the camera sensor 142 (See FIG. 3) is activated to a state in which it can sense the user based on an activation event, the controller 180 (See FIG. 3) determines whether or not the user's face is detected by the camera sensor 142. When the user's face is not recognized through the camera sensor 142 although the camera sensor 142 has been activated according to the determination results, the controller 180 may adjust a magnifying power of the camera sensor 142 or output guide information for changing the user's location or the position of the terminal main body 100.

Figure 9A:
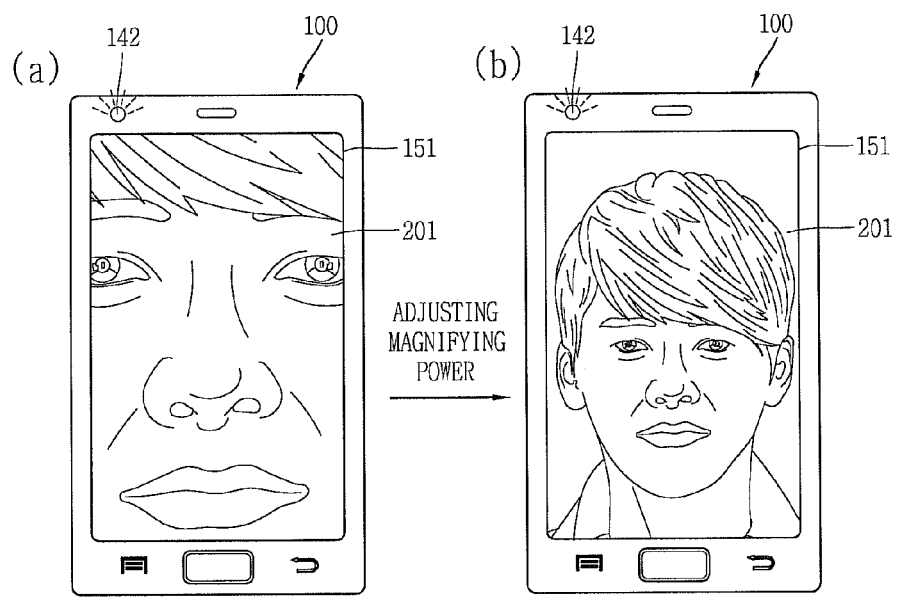
FIGS. 9A, 9B, 9C, and 9D are conceptual views for describing methods for controlling a camera of the mobile terminal and images input through a camera according to an embodiment disclosed in the present disclosure.

For example, as shown in FIG. 9A(a), when the magnifying power of the camera sensor 142 is set to be so high that data of the user's face is not included in an image 201 captured through the camera sensor 142, namely, when the region of the user's face is not entirely captured on the image 201, the controller 180 may adjust the magnifying power of the camera sensor 142.

Thus, as shown in FIG. 9A(b), the controller 180 may adjust the magnifying power of the camera sensor 142 to control 142 to entirely include face data corresponding to the user's face in the image 201 captured through the camera sensor 142.

Figure 9B:
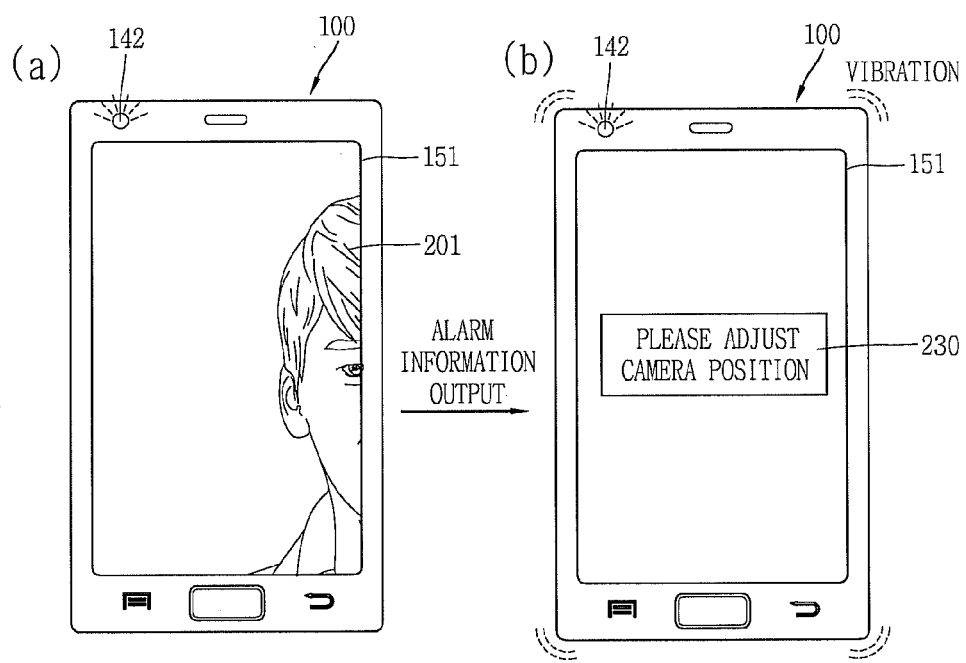

Also, as shown in FIG. 9B(a), when the user is too distant from the terminal main body 100 to be captured by the camera sensor 142, the controller 180 may output notification information for changing the user's location of the position of the terminal main body 100. For example, as shown in FIG. 9B(b), the controller 180 may output notification information guiding a location change by using at least one of a voice, a pop-up window 230, and vibration.

Thus, the user may recognize that the position of the terminal main body 100 or his location should be changed upon seeing the notification information.

Meanwhile, a method for recognizing the user's face through the camera sensor will be described with reference to FIGS. 9C and 9D.

The controller 180 may recognize a user's face by using a face recognition algorithm from image data applied through the camera sensor 142.

The face recognition algorithm is to recognize face data of a person from image data input through the camera sensor 142. Here, the face recognition algorithm may recognize and detect a person by using outline information or the shape or appearance of a person discriminated from other regions of the image data.

The face recognition algorithm may be divided into a face region extracting process of discriminating a face from the entire image and a face recognizing process of what kind of face a searched face is.

And, an angle between the recognized user's face and a virtual reference axis 210a set based on the terminal main body 100 or a deviation degree with respect to the virtual reference axis 210a set based on the length direction A-A' of the terminal main body 100 may be analyzed.

Figure 9C:
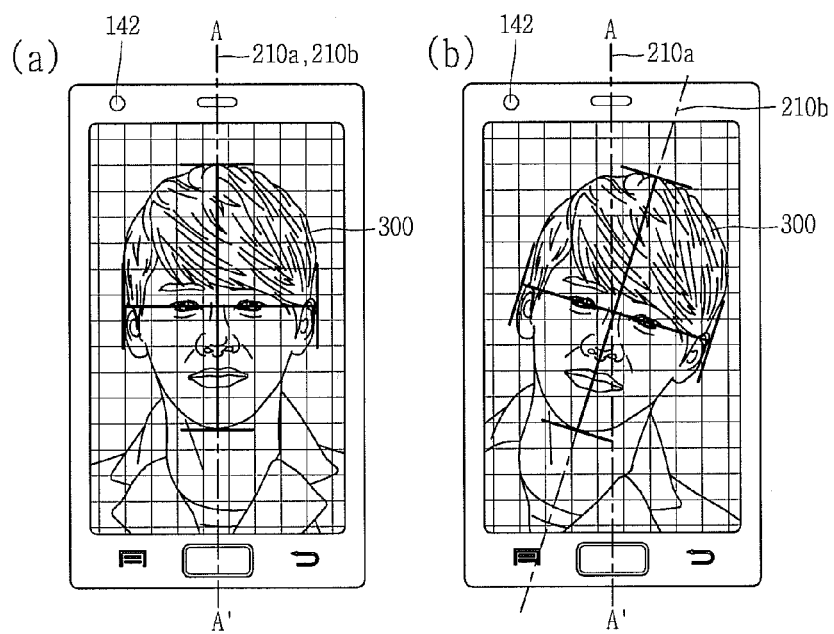

Meanwhile, as shown in FIG. 9C(a) and (b), the controller 180 may recognize the user's face 300 on the whole through the camera sensor 142. Thus, the controller 180 may control a display direction of the image output to the display unit according to a tilt degree between the reference direction 210b of the recognized user's face 300 and the virtual reference axis 210a set based on the length direction A-A' of the terminal main body 100.

Also, as shown in FIG. 9C, the controller 180 may recognize at least one of eyes, nose, mouth, and ears, rather than recognizing the user's face 300 on the whole, to estimate the direction of the user's face.

Figure 9D:
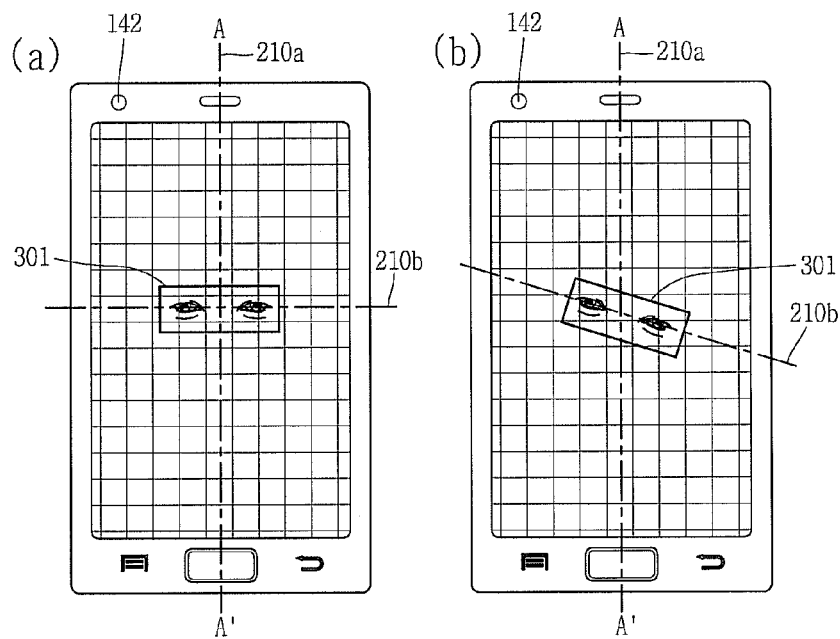

For example, as shown in FIG. 9D(a) and (b), the controller 180 detects a region 301 corresponding to the recognized eyes of the user's face. And, the controller 180 may control the display direction of an image output to the display unit according to the reference axis 210b set based on the region 301 corresponding to the recognized eyes and a tilt degree with the virtual reference axis 210a set based on the length direction A-A' of the terminal main body 100.

In the above, the method for changing an output direction of an image displayed on the display unit according to the direction of the user's eyes has been described. Hereinafter, a method for displaying a changed image when an output direction of an image is changed according to a direction of the user's eyes will be described in detail.

Figure 10A:
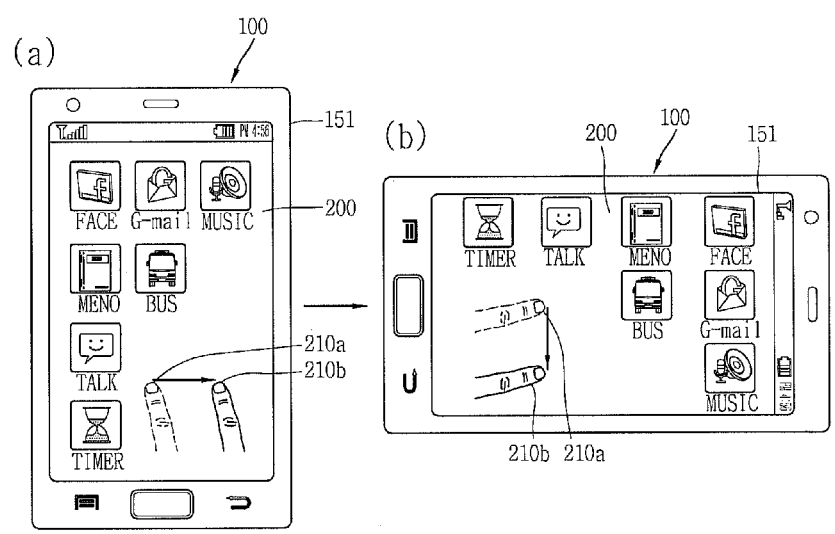
Figure 10B:
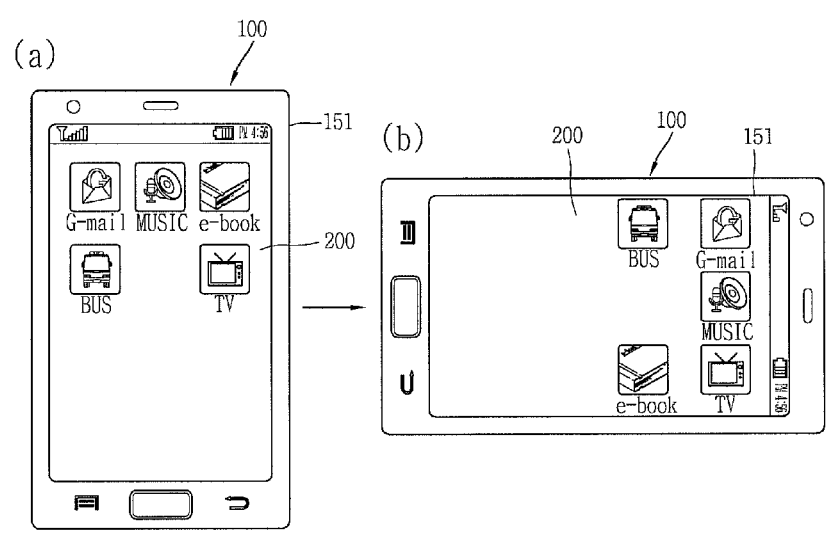

FIGS. 10A, 10B, and 11 are conceptual views for describing methods for outputting an image from a mobile terminal according to an embodiment disclosed in the present disclosure.

As discussed above, in the mobile terminal according to an embodiment of the present invention, a display direction of an image output to the display unit may be changed such that it is consistent with the direction of the user's eyes.

FIGS. 10A and 10B are conceptual views of a method for changing a display of a home screen according to the direction of the user's eyes.

As illustrated in FIG. 10A(a) and (b), when there is no change in the direction of the user's face 300 with respect to a rotation of the terminal main body 100, the controller 180 (See FIG. 3) rotates a display direction of an image 200 output to the display unit 151 such that it corresponds to the direction of the user's face 300 (or the direction of the user's eyes).

The controller 180 rotates the display direction of icons corresponding to applications displayed on the home screen as shown in FIG. 10A(b). Also, an array direction of text information may be changed to correspond to the rotation of the icons. Also, the controller 180 may change resolution of the text according to the change in the display direction of the text according to the change in the display direction of the image. The controller 180 may maintain the array positions of the icons as is to provide the user with a virtually accustomed environment.

Meanwhile, as shown in FIG. 10A(a), when a touch input (flicking or dragging) is input to a second spot 210b from a first spot 210a with respect to the home screen, as shown in FIG. 10B(b), icons of the applications displayed on the home screen to icons of a different application.

And, though the display direction of the image is changed, the controller 180 may move the icons of the applications in the same direction, that is to move the icon of the applications before the display direction of the image is changed.

This is to provide a user interface environment accustomed to the user although the display direction of an image is changed.

Thus, as shown in FIG. 10A(b), when a touch input is applied from the first spot 210a to the second spot 210b, namely, when a flicking or dragging input is applied in the same touch direction as that applied in FIG. 10A(a), icons of applications, of which at least one is different from those illustrated in FIG. 10A(b), are displayed as shown in FIG. 10A(b).

Also, as shown in FIG. 10B(b), the icons changed according to the touch input from the first spot 210a to the second spot 210b may be identical to the icons before the display direction is changed as shown in FIG. 10B(a).

Next, a method for displaying an image according to a change in an output direction of an image including text information with reference to FIG. 11.

As shown in FIG. 11(a), the direction of the user's face may be maintained in the first direction 310, and when the direction of the user's face is rotated by 90 degrees rightwardly from the first direction 310, the direction of the user's eyes is rotated by 90 degrees rightwardly from the first direction 310. In this case, the controller 180 changes the display direction of the image 200 such that it corresponds to the direction of the user's eyes.

First, as shown in FIG. 11(b), the controller 180 may change only the display direction of the image 200 without changing the size of text, the array direction of the text, or the like, included in the image 200.

Also, as shown in FIG. 11(c), when the display direction of the image 200 is changed and a horizontal region for outputting text is expanded in comparison to that illustrated in FIG. 11(a), the controller 180 may adjust the size of the text such that it corresponds to the expanded horizontal region.

Namely, the controller 180 may reduce or magnify the display size of text as the region for displaying text is reduced or magnified.

Also, as shown in FIG. 11(d), when the display direction of the image 200 is changed and the horizontal region for outputting text is expanded in comparison to that illustrated in FIG. 11(a), the controller 180 may adjust the number of text.

For example, 11 alphabets (A, B, C, D, E, F, G, H, I, J, K) are displayed in a row in FIG. 11(a), and then, when a horizontal region for outputting text is expanded as shown in FIG. 11(d) in comparison to that of FIG. 11(a), a larger number of alphabets than those in FIG. 11(a) may be output.

As discussed above, when the size of the region for displaying data is changed according to a change in the display direction of an image, the controller 180 may change an amount of data, resolution, or the like, to correspond to the changed size.

Hereinafter, a specific embodiment of changing a display direction of an image while a particular application is being used will be described. FIGS. 12A, 12B, 13, 14A, and 14B are conceptual views for describing methods for changing a display direction of an image by interworking with a function of an application being executed in the mobile terminal according to an embodiment disclosed in the present disclosure.

First, an example of changing a display direction of an image while a photo-related application is being executed will be described with reference to FIGS. 12A and 12B.

Figure 12A:
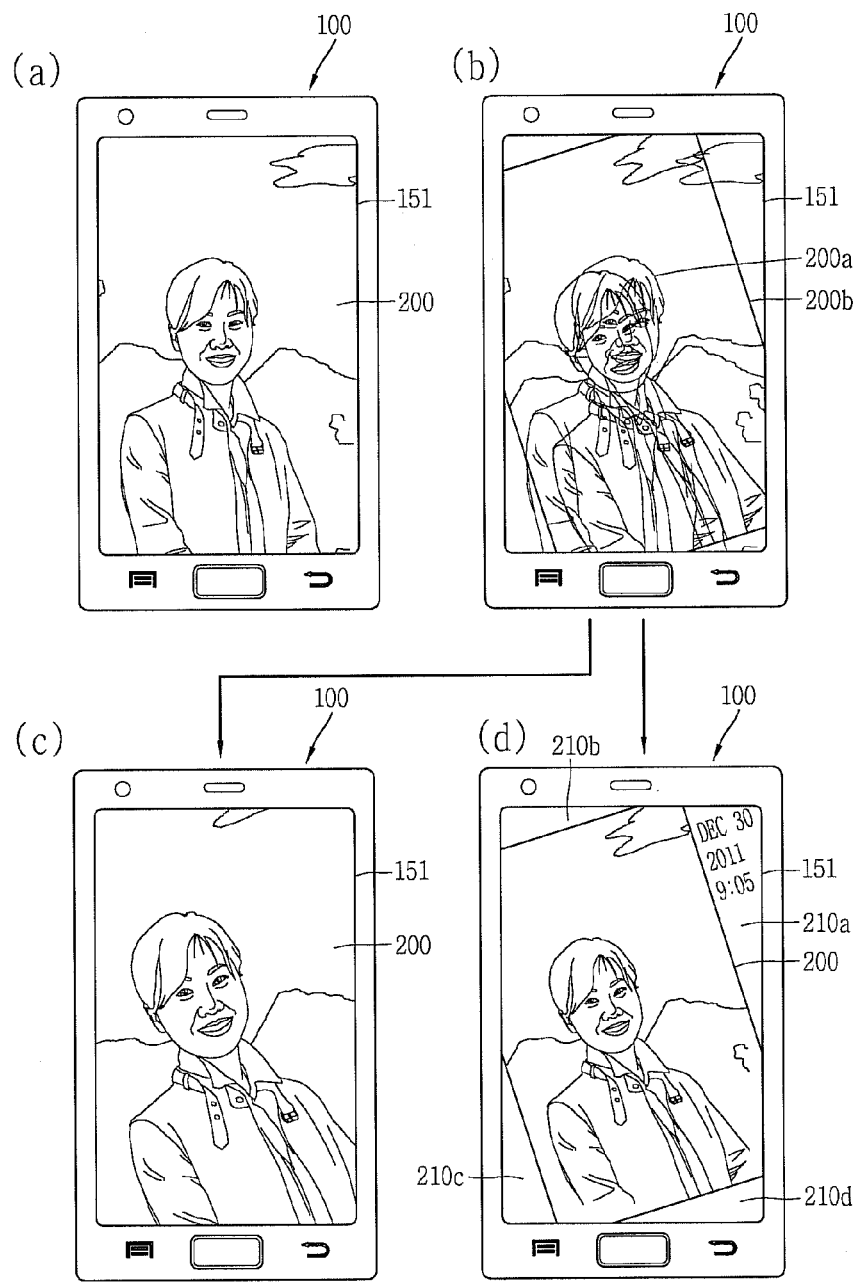
FIGS. 12A, 12B, 13, 14A, and 14B are conceptual views for describing methods for changing a display direction of an image by interworking with a function of an application being executed in the mobile terminal according to an embodiment disclosed in the present disclosure.

For example, as shown in FIG. 12A(a), when the direction of the user's eyes or the direction of the terminal main body 100 is changed while a photograph (or an image) 200 is being output, the controller 180 may change the display direction of an image 200b such that it corresponds to the direction of the user's eyes.

As shown in FIG. 12A(b), the controller 180 may change the display direction of the image from 200a to 200b.

Also, in order to provide a visual effect to the user, the controller 180 may display the previous image before the display direction is changed in an overlapping manner while the display direction of the image is changed to maintain the output direction with respect to the user.

Also, as shown in FIG. 12(c), when the region for outputting the image 200 is changed according to the change in the output direction of the image 200, the controller 180 may control a display size of the image or a display range of the image such that it corresponds to the changed region.

Also, when the display region of the image is changed according to the change in the display direction, the controller 180 may adjust resolution of the image such that it corresponds to the changed output region.

Thus, as illustrated, the image 200 output in FIG. 12A(c) may be magnified to be larger than the image 200 output in FIG. 12A(a), and displayed.

Also, as shown in FIG. 12A(d), edge regions 210a, 210b, 210c, and 210d exceeding the edges of the image 200 according to the change in the display direction of the image 200 may be displayed.

Namely, based on the rotation of the image 200, edge regions exceeding the edges of the image 200 are displayed, and information associated with the output image 200 may be displayed on at least one of the edge regions 210a, 210b, 210c, and 210d.

For example, as shown in FIG. 12A(d), information regarding a date at which the image 200 output to the first edge region 210a exceeding the edges of the image 200 is captured.

Besides, information regarding an image and virtual keys for receiving a control command may be output to at least one of the edge regions 210a, 210b, 210c, and 210d.

Figure 12B:
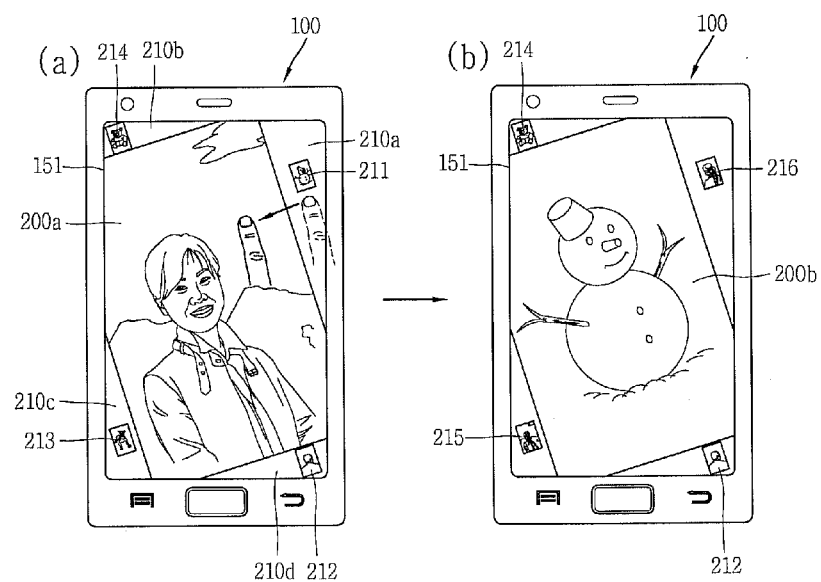

Also, as shown in FIG. 12B(a), when different images are included in a group (or an image album) including the image 200a output to the display unit, the different images included in the group may be output to the edge regions 210a, 210b, 210c, and 210d.

For example, as illustrated, at least portions or thumbnails of the different images arranged at positions corresponding to the direction in which the edge regions are positioned based on the image output to the display unit 151 may be displayed on the 210a, 210b, 210c, and 210d.

Also, as shown in FIG. 12B(a), when a touch is input in a first direction with respect to the display unit 151, the controller 180 may output an image 200b (See FIG. 12B(b)) corresponding to a thumbnail 211 arranged in the edge region 210a in the direction corresponding to the touch input.

In another example, as shown in FIG. 13(a), when a video is played in the terminal, as shown in FIG. 13(b), the display direction of the image 200 is changed according to a rotation of the terminal main body 100. At this time, the controller 180 may output a virtual key for controlling the video to the edge regions 210a, 210b, 210c, and 210d generated based on the rotation of the image 200.

For example, while the user is viewing DMB (Digital Multimedia Broadcasting) in the terminal, when a display direction of the image is changed according to a rotation of the terminal main body 100, the controller 180 may display channel information, a channel shift key, a volume key, and the like, on the edge regions 210a, 210b, 210c, and 210d.

Also, when the display region of the image is changed as shown in FIG. 13(c) according to the change in the display direction of the image, image data that could not be displayed in the previous display region may be additionally displayed.

Meanwhile, a method for changing a display direction of an image in an executed screen of an application related to a map, a navigation, or the like, displaying an azimuth information will be described with reference to FIGS. 14A and 14B.

Figure 14A:
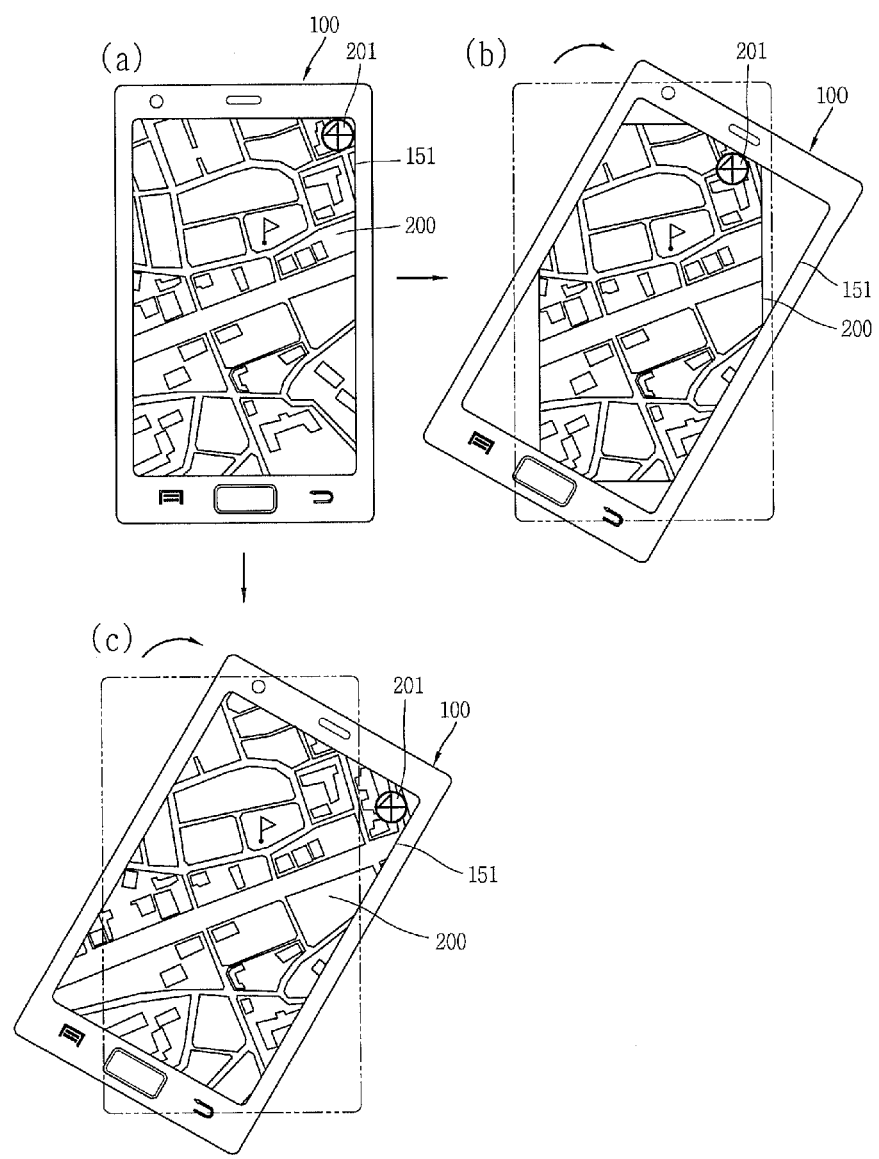

First, as shown in FIG. 14A(a), when the direction of the user's eyes or the direction of the terminal main body 100 is changed while a map image 200 is being outputted, as shown in FIG. 14A(b), the controller 180 may change the display direction of the map image 200 such that it corresponds to the direction of the user's eyes.

Although the terminal main body 100 is tilted, the controller 180 may control a reference azimuth such that it corresponds to the direction of the user's eyes. Thus, the direction indicated by the reference azimuth information 201 output to FIG. 14A(a), may be displayed based on the output direction of the screen as shown in FIG. 14A(b) regardless of the tilt direction of the terminal main body 100. Also, it may be possible to set the reference azimuth based on the terminal main body 100, rather than, the output direction of the screen according to a user selection.

Figure 13:
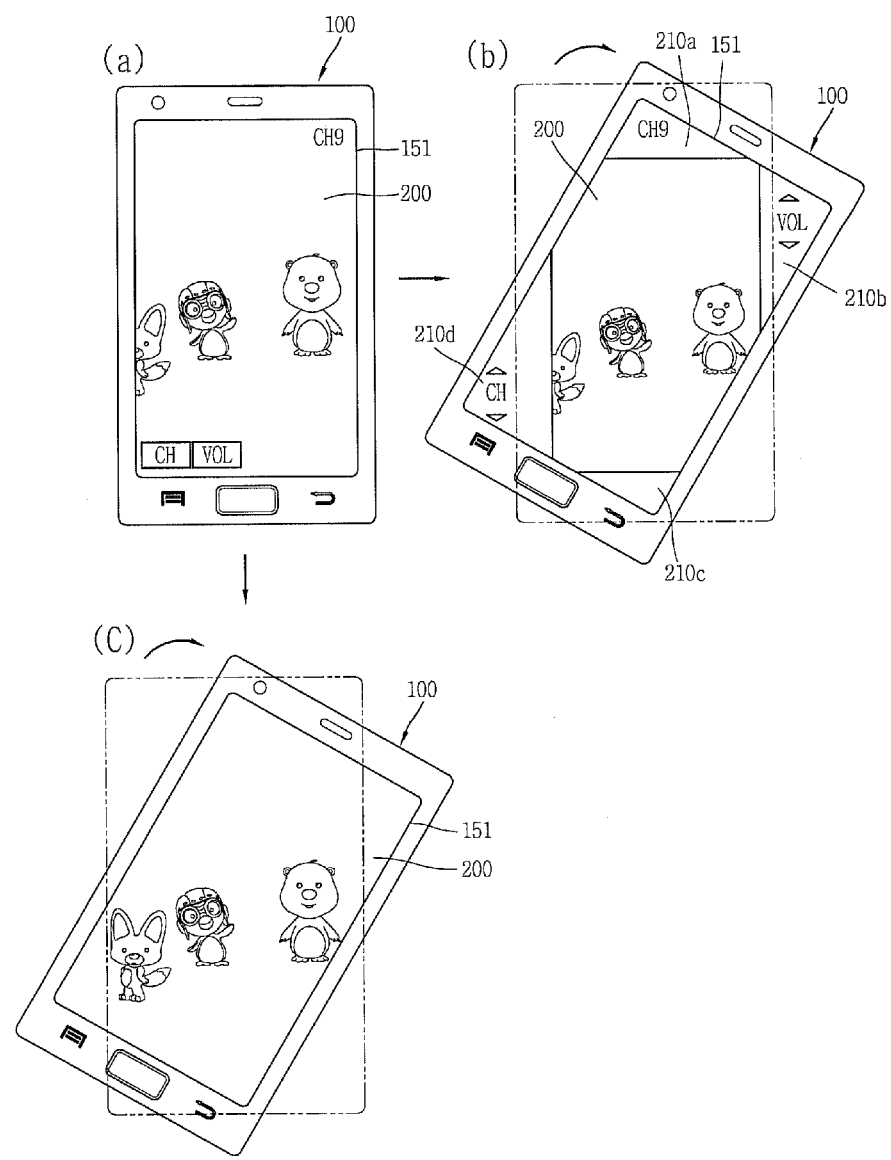

Also, although the display direction of the map image 200 is changed, the controller 180 may change a display range of the map image 200 such that the map image 200 is displayed on the edge region as shown in FIG. 14A(c) so that the edge regions described with reference to FIGS. 12A, 12B, and 13 cannot be generated.

Figure 14B:
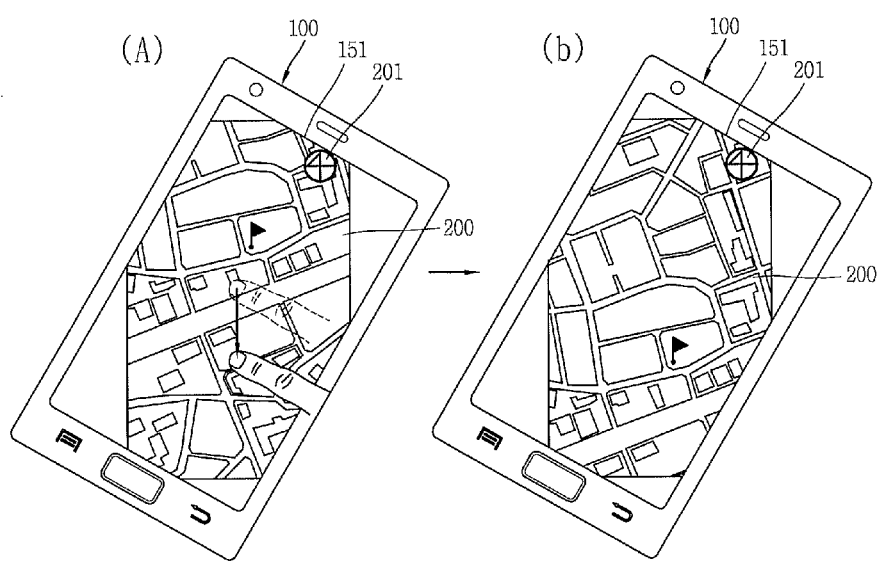

Also, as shown in FIG. 14B(a), in response to a touch input for moving a display range of the image 200 output to the display unit 151, the controller 180 may move the display region of the image 200 based on the display direction of the image 200.

Namely, a control command generated in response to a touch input for moving the image displayed on the display unit 151 may be generated to correspond to an output direction of an image.

Thus, as shown in FIG. 14B(a), in response to the touch input applied to the display unit 151, the controller f180 may move the image 200 upwardly as shown in FIG. 14B(b).

Namely, although the direction of the touch input is a diagonal direction based on the terminal main body 100, the direction of the touch input is a length direction with respect to the image 200 based on the output direction of the image 200, so the controller 180 may move the display range of the image 200 based on the output image 200.

Also, although not shown, when videophone is being executed in the terminal, the camera sensor 142 (See FIG. 3) is constantly activated. Thus, the controller 180 may control a display direction of an image output to the display unit 151 such that it corresponds to the direction of the user's face (or the direction of the user's eyes) in real time, without having to sense an activation event for activating the camera sensor.

As described above, according to the mobile terminal and the control method thereof according to an embodiment of the present invention, when a movement of the terminal is sensed, a user's location is sensed by using the camera sensor to thereby change an output direction of an image according to the user's location. Thus, the output direction with respect to the user can be maintained.

Also, according to the mobile terminal and the control method thereof according to an embodiment of the present invention, information related to an output image may be displayed on the edge regions generated as an output direction of an image is changed, or a control command may be received by using the edge regions. Thus, unnecessary regions generated according to a change in the output direction of an image can be advantageously utilized.

In the embodiments of the present invention, the foregoing method can be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a terminal main body;
   a display unit disposed on a front surface of the main body and configured to display an image;
   a sensing unit mounted in the main body and configured to sense a user's location; and
   a controller configured to control a display direction of the image displayed on the display unit and maintain the image in an output direction with respect to the user,
   wherein the controller analyzes a direction of the user's eyes with respect to the main body, and rotates the image on the display unit to correspond to the direction of the user's eyes,
   wherein an edge region exceeding edges of the image is displayed on the display unit when the image is rotated, and wherein the controller is further configured to: newly display, on the edge region, at least portions or thumbnails of different images arranged at positions corresponding to the direction in which the edge region is positioned based on the image displayed on the display unit when the edge region exceeding edges of the image is displayed, wherein the different images are included in a group including the image displayed on the display unit, wherein the at least portions or thumbnails of different images are not displayed on the display unit before the rotation of the image, wherein while the display direction of the image is being changed in order to maintain an output direction with respect to the user, a previous image displayed before the display direction is changed overlaps.

2. The mobile terminal of claim 1, wherein the controller discriminates the user's face from image data applied through the sensing unit, and analyzes a relative position between the main body and the user by using the discriminated user's face.

3. The mobile terminal of claim 2, wherein the controller calculates an angle between a virtual reference axis set based on a first direction of the main body and the discriminated user's face and controls a display direction of the image based on the calculated angle.

4. The mobile terminal of claim 3, wherein when the calculated angle is outside the reference range, the controller changes the display direction of the image.

5. The mobile terminal of claim 1, wherein a camera sensor is activated in response to the main body being tilted at a reference angle or greater in a pre-set direction.

6. The mobile terminal of claim 1, wherein the controller adjusts a magnifying power of a camera sensor and data of the user's face is included in image data applied through the camera sensor.

7. The mobile terminal of claim 6, wherein when the user's face is not discriminated through the image data, the controller outputs notification information by using at least one of a voice, a pop-up window, and vibration.

8. The mobile terminal of claim 1, wherein the sensing unit senses the user's location based on occurrence of at least one of a movement event with respect to the main body, a power supply event, a touch event, and an application execution event.

9. The mobile terminal of claim 8, wherein when the power supply event with respect to the main body occurs, and when a locked state in which an input of a control command with respect to an application is limited is released, the sensing unit is activated.

10. The mobile terminal of claim 8, wherein the sensing unit includes a camera capturing an image, and the controller converts the captured image into image data, discriminates the user's face by using the image data, and analyzes the user's location by using the discriminated face.

11. The mobile terminal of claim 1, wherein when an output region of the image is changed according to the rotation of the image, the controller adjusts at least one of a display range of the image and a size of the image to correspond to the changed output region.

12. The mobile terminal of claim 11, wherein the controller adjusts resolution of the image to correspond to the changed output region.

13. The mobile terminal of claim 1, wherein the display unit is configured to be available for a touch input, and when a touch input for moving an image displayed on the display unit is applied to the display unit, a control command for moving the image in a direction corresponding to the display direction of the image is generated.

14. The mobile terminal of claim 1, wherein when a touch input in a first direction with respect to the display unit, the controller outputs an image corresponding to the thumbnail arranged in the edge region corresponding to the touch input in the first direction.

15. The mobile terminal of claim 1, wherein the at least portions or thumbnails of different images are displayed on the edge region simultaneously with the image displayed at a center area of the display unit.

* * * * *